(12) United States Patent
Anderson et al.

(10) Patent No.: US 11,084,282 B2
(45) Date of Patent: Aug. 10, 2021

(54) FLUID EJECTION DIES INCLUDING STRAIN GAUGE SENSORS

(71) Applicant: HEWLETT-PACKARD DEVELOPMENT COMPANY, L.P., Spring, TX (US)

(72) Inventors: Daryl E Anderson, Corvallis, OR (US); James Gardner, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 70 days.

(21) Appl. No.: 16/486,943

(22) PCT Filed: Apr. 24, 2017

(86) PCT No.: PCT/US2017/029137
§ 371 (c)(1),
(2) Date: Aug. 19, 2019

(87) PCT Pub. No.: WO2018/199895
PCT Pub. Date: Nov. 1, 2018

(65) Prior Publication Data
US 2021/0129532 A1    May 6, 2021

(51) Int. Cl.
*B41J 2/125* (2006.01)
*B41J 2/045* (2006.01)
*G01L 5/1627* (2020.01)
*B41J 2/14* (2006.01)
*B41J 29/393* (2006.01)

(52) U.S. Cl.
CPC ........... *B41J 2/125* (2013.01); *B41J 2/04541* (2013.01); *B41J 2/04586* (2013.01); *B41J 2/14153* (2013.01); *G01L 5/1627* (2020.01); *B41J 29/393* (2013.01)

(58) Field of Classification Search
CPC .... B41J 2/125; B41J 2/04541; B41J 2/04586; B41J 2/14153; B41J 29/393; G01L 5/1627
See application file for complete search history.

(56) References Cited

U.S. PATENT DOCUMENTS

| | | | |
|---|---|---|---|
| 6,398,329 B1 | 6/2002 | Boyd et al. | |
| 7,740,351 B2 * | 6/2010 | Shinohara | B41J 11/007 347/104 |
| 8,579,405 B2 | 11/2013 | Huyghen et al. | |

(Continued)

FOREIGN PATENT DOCUMENTS

| | | |
|---|---|---|
| CN | 1533890 | 10/2004 |
| CN | 103029438 | 4/2013 |

(Continued)

OTHER PUBLICATIONS

HP Pagewide Web Presses Obtaining Long Printhead Life, Aug. 27, 2015, <http://www8.hp.com/h20195/v2/GetPDF.aspx/4AA6-1111ENW.pdf>.

*Primary Examiner* — Thinh H Nguyen
(74) *Attorney, Agent, or Firm* — Dicke Billig & Czaja PLLC

(57) ABSTRACT

A fluid ejection die includes a plurality of actuation devices to eject fluid drops, at least one strain gauge sensor to sense strain, and a comparator. The comparator is to provide a fault signal in response to the sensed strain exceeding an impact threshold.

20 Claims, 7 Drawing Sheets

(56) References Cited

U.S. PATENT DOCUMENTS

| | | |
|---|---|---|
| 8,746,694 B2 | 6/2014 | Moore et al. |
| 8,864,278 B2 | 10/2014 | Donahue et al. |
| 2004/0090475 A1 | 5/2004 | Ioka et al. |
| 2004/0233244 A1 | 11/2004 | Elgee et al. |

FOREIGN PATENT DOCUMENTS

| | | |
|---|---|---|
| CN | 104441991 | 3/2015 |
| CN | 106335282 | 1/2017 |
| CN | 106541715 | 3/2017 |
| EP | 1057634 | 12/2000 |
| EP | 3062080 | 8/2016 |
| JP | 62159574 | 7/1987 |
| JP | 2002166552 | 6/2002 |
| JP | 2005103818 | 4/2005 |
| JP | 2015085660 | 5/2015 |
| JP | 2017024379 | 2/2017 |
| WO | WO-2010089234 | 8/2010 |
| WO | WO-2011149469 | 12/2011 |
| WO | WO-2016162321 | 10/2016 |

\* cited by examiner

FLUID EJECTION DIES INCLUDING STRAIN GAUGE SENSORS

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

It would be advantageous to be able to detect and react to an impact between a printhead and a medium or other object before further damage occurs. Being able to detect the severity of impacts to determine whether a printhead change is necessary would also be useful. Some printhead to print medium impacts result in contact to the printhead surface that smear print results but do not completely halt the medium. In these cases, if a portion of the medium (e.g., corrugate packaging) is torn and drags across the printhead, the printhead may be damaged if the printhead is not stopped immediately. The print job may also need to be discarded if the printhead is not stopped immediately. Printhead impacts and the defective print jobs resulting therefrom often go undetected until print quality audits are completed, resulting in large waste to the customer. Latent detection of printhead impacts may also result in permanent damage to the printhead.

Accordingly, disclosed herein is a fluid ejection system including at least one strain gauge sensor integrated within a fluid ejection die of the fluid ejection system. The at least one strain gauge sensor is continuously monitored to determine whether the fluid ejection die has impacted an object. When an impact is detected, a fault signal is provided. The fault signal may be used to stop or modify operation of the fluid ejection system or to alert a user of the fluid ejection system that an impact has been detected.

Figure 1A:
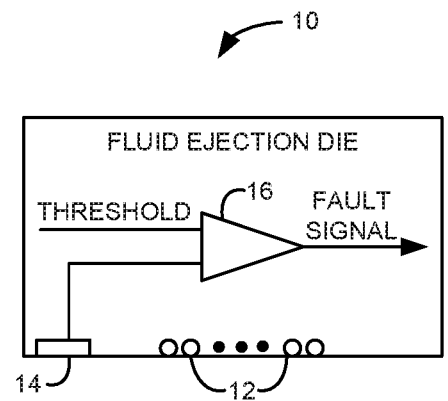
FIG. 1A is a block diagram illustrating one example of a fluid ejection die.

FIG. 1A is a block diagram illustrating one example of a fluid ejection die 10. Fluid ejection die 10 includes a plurality of actuation devices 12 to eject fluid drops. In one example, actuation devices 12 are nozzles or fluidic pumps to eject fluid drops. Fluid ejection die 10 also includes at least one strain gauge sensor 14 to sense strain and a comparator 16. A first input of comparator 16 receives the sensed strain from the at least one strain gauge sensor 14. A second input of comparator 16 receives an impact threshold. Comparator 16 compares the sensed strain to the impact threshold and outputs a fault signal in response to the sensed strain exceeding the impact threshold.

Figure 1B:
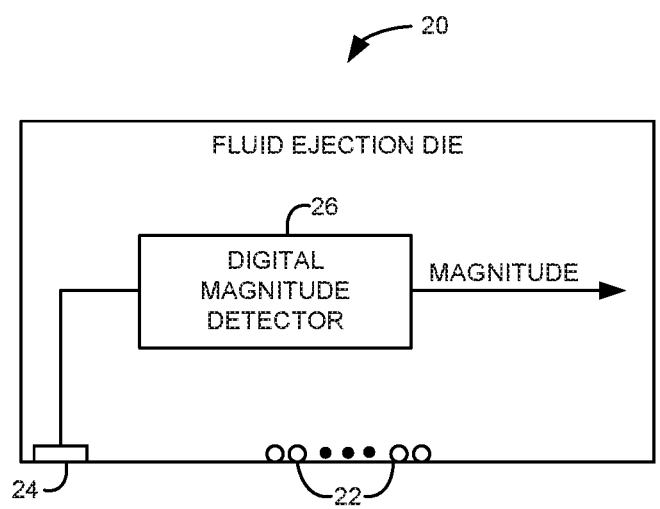
FIG. 1B is a block diagram illustrating another example of a fluid ejection die.

FIG. 1B is a block diagram illustrating another example of a fluid ejection die 20. Fluid ejection die 20 includes a plurality of actuation devices 22 to eject fluid drops. In one example, actuation devices 22 are nozzles or fluidic pumps to eject fluid drops. Fluid ejection die 20 also includes at least one strain gauge sensor 24 to sense strain and a digital magnitude detector 26. The input of digital magnitude detector 26 receives the sensed strain from the at least one strain gauge sensor 24. Digital magnitude detector 26 detects the magnitude of the sensed strain and outputs a digital value indicating the magnitude of the sensed strain.

Figure 1C:
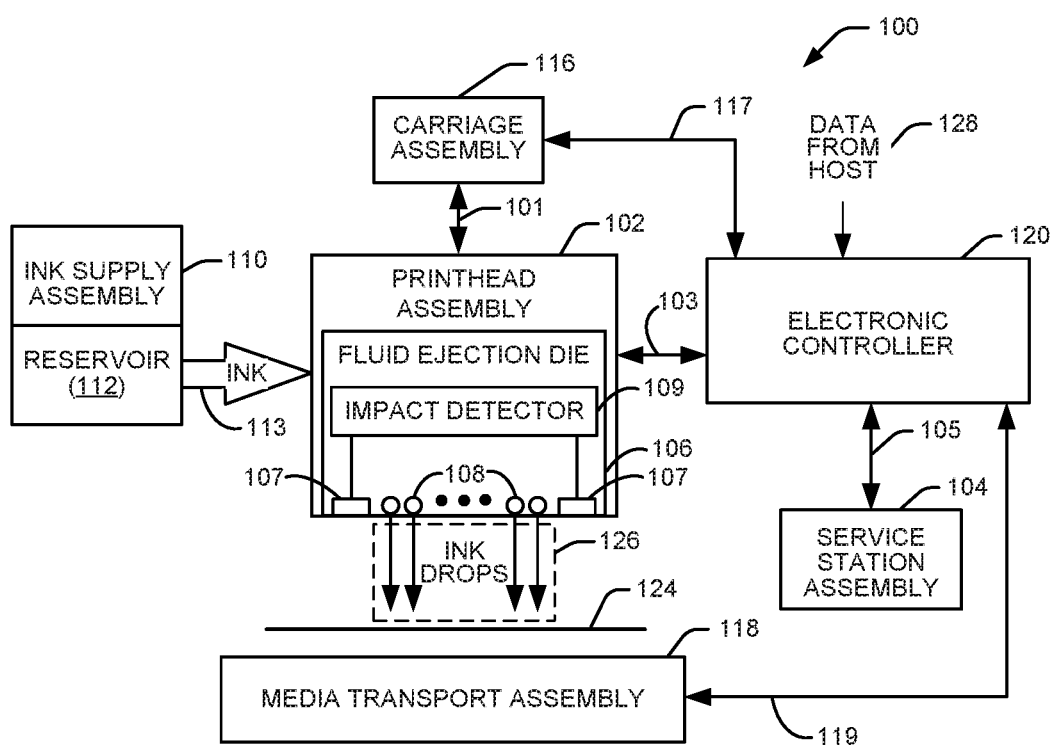
FIG. 1C is a block diagram illustrating one example of a fluid ejection system.

FIG. 1C is a block diagram illustrating one example of a fluid ejection system 100. Fluid ejection system 100 includes a fluid ejection assembly, such as printhead assembly 102, and a fluid supply assembly, such as ink supply assembly 110. In the illustrated example, fluid ejection system 100 also includes a service station assembly 104, a carriage assembly 116, a print media transport assembly 118, and an electronic controller 120. While the following description provides examples of systems and assemblies for fluid handling with regard to ink, the disclosed systems and assemblies are also applicable to the handling of fluids other than ink.

Printhead assembly 102 includes at least one printhead or fluid ejection die 106 which ejects drops of ink or fluid through a plurality of orifices or nozzles 108. In one example, the drops are directed toward a medium, such as print media 124, so as to print onto print media 124. In one example, print media 124 includes any type of suitable sheet material, such as paper, card stock, transparencies, Mylar, fabric, and the like. In another example, print media 124 includes media for three-dimensional (3D) printing, such as a powder bed, or media for bioprinting and/or drug discovery testing, such as a reservoir or container. In one example, nozzles 108 are arranged in at least one column or array such that properly sequenced ejection of ink from nozzles 108 causes characters, symbols, and/or other graphics or images to be printed upon print media 124 as printhead assembly 102 and print media 124 are moved relative to each other.

Fluid ejection die 106 also includes a plurality of strain gauge sensors 107 and an impact detector 109. The strain gauge sensors 107 sense strain within fluid ejection die 106. In one example, strain gauge sensors 107 enable fluid ejection system 100 to monitor the stress experienced by fluid ejection die 106. Each strain gauge sensor 107 exhibits changes in electrical conductivity when corresponding areas of fluid ejection die 106 are stressed. The amount of stress is quantified by measuring the changes in conductivity. By analyzing the stress at each corresponding area of fluid ejection die 106, impact detector 109 can determine whether fluid ejection die 106 has impacted an object.

Ink supply assembly 110 supplies ink to printhead assembly 102 and includes a reservoir 112 for storing ink. As such, in one example, ink flows from reservoir 112 to printhead assembly 102. In one example, printhead assembly 102 and ink supply assembly 110 are housed together in an inkjet or fluid-jet print cartridge or pen. In another example, ink supply assembly 110 is separate from printhead assembly 102 and supplies ink to printhead assembly 102 through an interface connection 113, such as a supply tube and/or valve.

Carriage assembly 116 positions printhead assembly 102 relative to print media transport assembly 118 and print media transport assembly 118 positions print media 124 relative to printhead assembly 102. Thus, a print zone 126 is defined adjacent to nozzles 108 in an area between printhead assembly 102 and print media 124. In one example, printhead assembly 102 is a scanning type printhead assembly such that carriage assembly 116 moves printhead assembly 102 relative to print media transport assembly 118. In another example, printhead assembly 102 is a non-scanning type printhead assembly such that carriage assembly 116 fixes printhead assembly 102 at a prescribed position relative to print media transport assembly 118.

Service station assembly 104 provides for spitting, wiping, capping, and/or priming of printhead assembly 102 to maintain the functionality of printhead assembly 102 and, more specifically, nozzles 108. For example, service station assembly 104 may include a rubber blade, wiper, or roller which is periodically passed over printhead assembly 102 to wipe and clean nozzles 108 of excess ink. In addition, service station assembly 104 may include a cap that covers printhead assembly 102 to protect nozzles 108 from drying out during periods of non-use. In addition, service station assembly 104 may include a spittoon into which printhead assembly 102 ejects ink during spits to insure that reservoir 112 maintains an appropriate level of pressure and fluidity, and to insure that nozzles 108 do not clog or weep. Functions of service station assembly 104 may include relative motion between service station assembly 104 and printhead assembly 102.

Electronic controller 120 communicates with printhead assembly 102 through a communication path 103, service station assembly 104 through a communication path 105, carriage assembly 116 through a communication path 117, and print media transport assembly 118 through a communication path 119. In one example, when printhead assembly 102 is mounted in carriage assembly 116, electronic controller 120 and printhead assembly 102 may communicate via carriage assembly 116 through a communication path 101. Electronic controller 120 may also communicate with ink supply assembly 110 such that, in one implementation, a new (or used) ink supply may be detected.

Electronic controller 120 receives data 128 from a host system, such as a computer, and may include memory for temporarily storing data 128. Data 128 may be sent to fluid ejection system 100 along an electronic, infrared, optical or other information transfer path. Data 128 represent, for example, a document and/or file to be printed. As such, data 128 form a print job for fluid ejection system 100 and includes at least one print job command and/or command parameter.

In one example, electronic controller 120 provides control of printhead assembly 102 including timing control for ejection of ink drops from nozzles 108. As such, electronic controller 120 defines a pattern of ejected ink drops which form characters, symbols, and/or other graphics or images on print media 124. Timing control and, therefore, the pattern of ejected ink drops, is determined by the print job commands and/or command parameters. In one example, logic and drive circuitry forming a portion of electronic controller 120 is located on printhead assembly 102. In another example, logic and drive circuitry forming a portion of electronic controller 120 is located off printhead assembly 102.

In one example, electronic controller 120 receives a fault signal from impact detector 109 in response to impact detector 109 detecting an impact of fluid ejection die 106. Electronic controller 120 may use the fault signal for numerous purposes, such as to stop or modify the operation of fluid ejection system 100 or to alert a user of fluid ejection system 100 that an impact event has occurred.

Figure 2A:
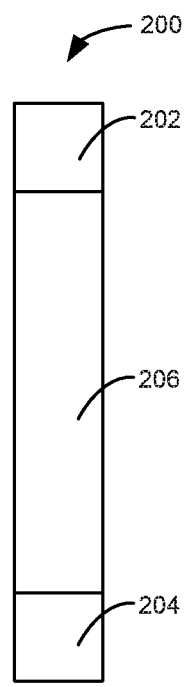
FIG. 2A illustrates one example of a strain gauge sensor.

FIG. 2A illustrates one example of a strain gauge sensor 200. In one example, strain gauge sensor 200 provides strain gauge sensor 14 of fluid ejection die 10 previously described and illustrated with reference to FIG. 1A, strain gauge sensor 24 of fluid ejection die 20 previously described and illustrated with reference to FIG. 1B, or each strain gauge sensor 107 of fluid ejection die 106 previously described and illustrated with reference to FIG. 1C. Strain gauge sensor 200 includes a first electrode 202, a second electrode 204, and a piezoelectric sensor element 206 electrically coupled between first electrode 202 and second electrode 204. Piezoelectric sensor element 206 exhibits a change in resistance in response to stress in one axis. Therefore, by biasing strain gauge sensor 200 with a constant current and measuring the voltage across piezoelectric sensor element 206 or by biasing strain gauge sensor 200 with a constant voltage and measuring the current through piezoelectric sensor element 206, the strain on piezoelectric sensor element 206 may be sensed.

Figure 2B:
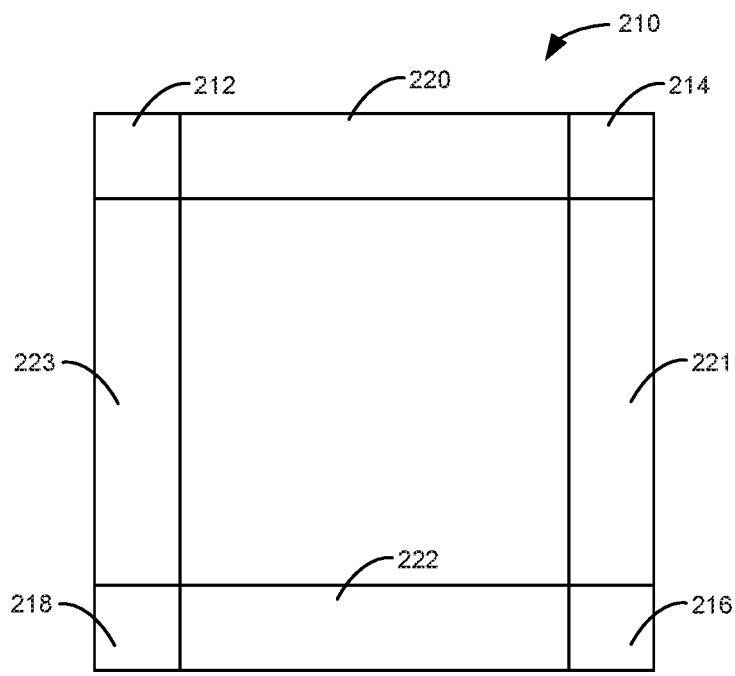
FIG. 2B illustrates another example of a strain gauge sensor.

FIG. 2B illustrates another example of a strain gauge sensor 210. In one example, strain gauge sensor 210 provides strain gauge sensor 14 of fluid ejection die 10 previously described and illustrated with reference to FIG. 1A, strain gauge sensor 24 of fluid ejection die 20 previously described and illustrated with reference to FIG. 1B, or each strain gauge sensor 107 of fluid ejection die 106 previously described and illustrated with reference to FIG. 1C. Strain gauge sensor 210 includes a first electrode 212, a second electrode 214, a third electrode 216, a fourth electrode 218, a first piezoelectric sensor element 220, a second piezoelectric sensor element 221, a third piezoelectric sensor element 222, and a fourth piezoelectric sensor element 223. First piezoelectric sensor element 220 is electrically coupled between first electrode 212 and second electrode 214. Second piezoelectric sensor element 221 is electrically coupled between second electrode 214 and third electrode 216. Third piezoelectric sensor element 222 is electrically coupled between third electrode 216 and fourth electrode 218. Fourth piezoelectric sensor element 223 is electrically coupled between fourth electrode 218 and first electrode 212.

Strain gauge sensor 210 exhibits a change in resistance in response to stress in two axes. Strain gauge sensor 210 is configured in a Wheatstone bridge configuration in which an external biasing voltage is applied across two opposing electrodes (e.g., first electrode 212 and third electrode 216) while the voltage is measured across the other two opposing electrodes (e.g., second electrode 214 and fourth electrode 218). Therefore, by biasing strain gauge sensor 210 with an external voltage and measuring the voltage across piezo-electric sensor elements 220-223, the strain on strain gauge sensor 210 may be sensed.

Figure 3:
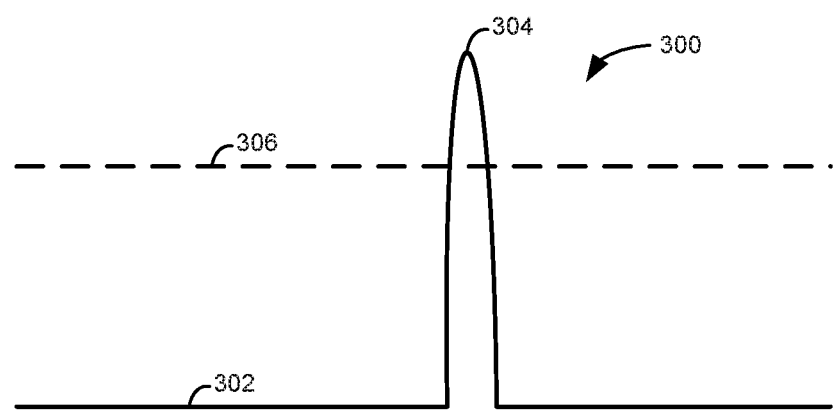
FIG. 3 illustrates one example of a strain gauge sensor signal corresponding to an impact event.

FIG. 3 illustrates one example of a strain gauge sensor signal 300 corresponding to an impact event. Prior to an impact event, the strain gauge sensor outputs a baseline strain as indicated at 302. Upon an impact event in which the fluid ejection die comes into contact with an object (e.g., print media), the strain gauge sensor outputs a signal that rises rapidly to a peak value as indicated at 304 and then falls rapidly back to the baseline strain 302.

The peak value at 304 may be used to determine that an impact has occurred and/or to determine the severity of the impact. During operation of the fluid ejection system, the strain gauge sensor signal is continuously compared to an impact threshold indicated at 306 and a fault signal is provided in response to the signal exceeding the impact threshold. The fault signal may be used to stop or modify the operation of the fluid ejection system or to alert a user of the fluid ejection system that an impact event has occurred. The peak value at 304 may also be detected to determine the magnitude of the signal. The magnitude may be used, for example, to determine the severity of the impact and whether damage to the fluid ejection die likely occurred or not.

Figure 4A:
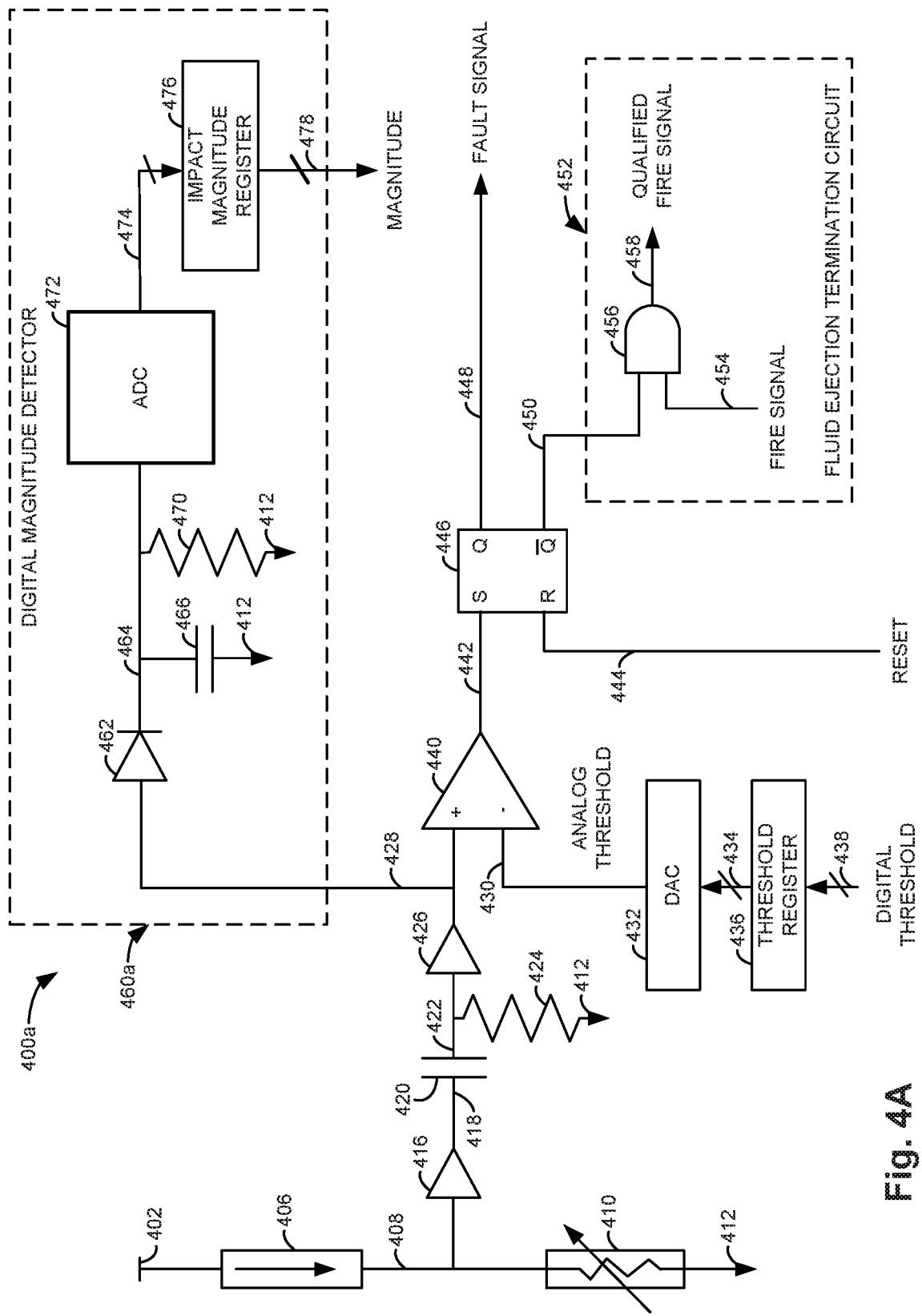
FIG. 4A is a circuit diagram illustrating one example of an impact detector.

FIG. 4A is a circuit diagram illustrating one example of an impact detector 400a. In one example, impact detector 400a provides impact detector 109 of fluid ejection die 106 previously described and illustrated with reference to FIG. 1C. In this example, impact detector 400a includes a biasing circuit 406 (e.g., a current source), a strain gauge sensor 410, a low pass filter 416, a direct current (DC) blocking capacitor 420, a bleeder resistor 424, a scaling buffer 426, a comparator 440, a digital to analog converter (DAC) 432, a threshold register 436, and a set-reset (S-R) latch 446. Low pass filter 416, DC blocking capacitor 420, bleeder resistor 424, and scaling buffer 426 provide a circuit to scale and offset the sensed strain from strain gauge sensor 410 and provide the scaled and offset sensed strain to comparator 440. In other examples, other suitable components may be used between strain gauge sensor 410 and comparator 440 to scale and offset the sensed strain.

In this example, impact detector 400a includes a digital magnitude detector 460a and a fluid ejection termination circuit 452. In other examples, digital magnitude detector 460a and/or fluid ejection termination circuit 452 may be excluded from impact detector 400a. Digital magnitude detector 460a includes a peaking diode 462, a peaking capacitor 466, a bleeder resistor 470, an analog to digital converter (ADC) 472, and an impact magnitude register 476. Fluid ejection termination circuit 452 includes an AND gate 456.

One terminal of biasing circuit 406 is electrically coupled to a supply voltage 402. The other terminal of biasing circuit 406 is electrically coupled to one terminal of strain gauge sensor 410 and the input of low pass filter 416 via an analog signal path 408. The other terminal of strain gauge sensor 410 is electrically coupled to a bias voltage 412 (e.g., a common or ground). The output of low pass filter 416 is electrically coupled to one terminal of DC blocking capacitor 420 through an analog signal path 418. The other terminal of DC blocking capacitor 420 is electrically coupled to one terminal of bleeder resistor 424 and the input of scaling buffer 426 through an analog signal path 422. The other terminal of bleeder resistor 424 is electrically coupled to the bias voltage 412.

The output of scaling buffer 426 is electrically coupled to the input of peaking diode 462 and the positive input (+) of comparator 440 through an analog signal path 428. The negative input (−) of comparator 440 is electrically coupled to the output of DAC 432 through an analog impact threshold value signal path 430. The input of DAC 432 is electrically coupled to the output of threshold register 436 through a digital signal path 434. The input of threshold register 436 receives a digital impact threshold value through a digital signal path 438. The output of comparator 440 is electrically coupled to the set input (S) of S-R latch 446 through a signal path 442. The reset input (R) of S-R latch 446 receives a reset signal through a signal path 444. The output (Q) of S-R latch 446 provides a fault signal on signal path 448.

The output (Q bar) of latch 446 is electrically coupled to a first input of AND gate 456 through a signal path 450. A second input of AND gate 456 receives a fire signal through a signal path 454. The output of AND gate 456 provides a qualified fire signal through a signal path 458.

The output of peaking diode 462 is electrically coupled to one terminal of peaking capacitor 466, one terminal of bleeder resistor 470, and the input of ADC 472 through an analog signal path 464. The other terminal of peaking capacitor 466 and the other terminal of bleeder resistor 470 are electrically coupled to bias voltage 412. The output of ADC 472 is electrically coupled to the input of impact magnitude register 476 through a digital signal path 474. The output of digital magnitude register 476 provides a magnitude signal on a digital signal path 478.

Biasing circuit 406 biases strain gauge sensor 410 (e.g., via a constant current). In one example, strain gauge sensor 410 is provided by a strain gauge sensor 200 previously described and illustrated with reference to FIG. 2A or a strain gauge sensor 210 previously described and illustrated with reference to FIG. 2B. Strain gauge sensor 410 provides a voltage signal corresponding to the sensed strain. In one example, low pass filter 416 low pass filters the sensed strain signal to remove errant noise signals that are shorter in duration than would be expected from an impact event. In other examples, low pass filter 416 is excluded from impact detector 400a. DC blocking capacitor 420 nulls out any process, voltage, and temperature (PVT) variation effects on the sensed strain signal, which may be small compared to the PVT effects. Bleeder resistor 424 prevents parasitic charge from accumulating on node 422. Bleeder resistor 424 is suitably sized so that the resistance does not significantly affect the sensed strain signal when an impact event occurs.

In one example, scaling buffer 426 scales the signal on node 422 to provide the scaled and offset sensed strain to the positive input of comparator 440 and/or to the input of peaking diode 462. In other examples, scaling buffer 426 is excluded from impact detector 400a. An analog impact threshold value is provided to the negative input of comparator 440. In this example, the analog impact threshold value is provided by a circuit including DAC 432 and threshold register 436. Threshold register 436 receives and stores a digital impact threshold value. The digital impact threshold value may be provided from a controller, such as electronic controller 120 previously described and illustrated with reference to FIG. 1C or from another suitable source. DAC 432 converts the digital impact threshold value to provide the analog impact threshold value. In other examples, the analog impact threshold value is provided by another suitable circuit.

Comparator 440 compares the sensed strain to the analog impact threshold value and outputs a logic low (e.g., "0") in response to the sensed strain being less than the analog impact threshold value. Comparator 440 compares the sensed strain to the analog impact threshold value and outputs a logic high (e.g., "1") for the duration that the sensed strain exceeds the analog impact threshold value. The logic high output of comparator 440 sets S-R latch 446, which transitions the output Q of S-R latch 446 from logic low (e.g., "0") to logic high (e.g., "1") and transitions the output Q bar of S-R latch 446 from logic high (e.g., "1") to logic low (e.g., "0"). The logic high at output Q of S-R latch 446 provides a fault signal indicating an impact event has occurred. S-R latch 446 maintains the fault signal until the S-R latch is reset. The fault signal may be provided to a controller, such as electronic controller 120 previously described and illustrated with reference to FIG. 1C, or to another suitable circuit. The fault signal may be used to stop or modify the operation of the fluid ejection system and/or to alert a user of the fluid ejection system that an impact event has occurred.

In one example, the reset signal provided to reset input R of S-R latch 446 is held at logic high until monitoring of the strain is started. For example, during power up of the fluid ejection system, signals may be unstable resulting in a false reading if the fluid ejection system is not given time for the signals to stabilize. Therefore, the reset signal is held at logic high until the fluid ejection system is fully powered up or until the fluid ejection system starts operating and ejecting fluid from the fluid ejection die. When monitoring of the strain is started, the reset signal is transitioned from logic high to logic low to enable S-R latch 446 to respond to an impact event. During operation of impact detector 400a, once S-R latch 446 is set in response to an impact event, S-R latch 446 remains set until the reset signal is provided to S-R latch 446. The reset signal may be provided by a controller, such as electronic controller 120 previously described and illustrated with reference to FIG. 1C, or by another suitable source.

Fluid ejection termination circuit 452 blocks a fluid ejection die fire signal in response to S-R latch 446 being set in response to an impact event. With S-R latch 446 reset, the output Q bar of S-R latch 446 is logic high. Therefore, with S-R latch 446 reset, AND gate 456 passes the fire signal provided to the input of AND gate 456 to provide the qualified fire signal at the output of AND gate 456. The qualified fire signal enables the fluid ejection die to eject fluid. With S-R latch 446 set in response to an impact event, the output Q bar of S-R latch 446 transitions from logic high to logic low. Therefore, with S-R latch 446 set, AND gate 456 blocks the fire signal provided to the input of AND gate 456 from passing to provide the qualified fire signal at the output of AND gate 456. Accordingly, without the qualified fire signal, the fluid ejection die is disabled and prevented from ejecting fluid. In this way, fluid ejection termination circuit 452 may immediately terminate operation of the fluid ejection die in response to an impact event. In other examples, the output Q bar of S-R latch 446 is provided to another suitable circuit to stop or modify the operation of the fluid ejection die in response to an impact event.

Digital magnitude detector 460a detects the magnitude of the sensed strain. In one example, impact detector 400a includes digital magnitude detector 460a and excludes comparator 440, DAC 432, threshold register 436, S-R latch 446, and fluid ejection termination circuit 452. Peaking diode 462 receives the sensed strain and charges peaking capacitor 466 to the peak magnitude of the sensed strain. Bleeder resistor 470 discharges peaking capacitor 466 between strain events. ADC 472 converts the peak analog signal from peaking capacitor 466 to provide a digital impact magnitude. The digital impact magnitude is stored in impact magnitude register 476, which provides the digital impact magnitude to another circuit. The digital impact magnitude may be provided to a controller, such as electronic controller 120 previously described and illustrated with reference to FIG. 1C, or to another suitable circuit. The digital impact magnitude may be used to determine the severity of the impact.

Figure 4B:
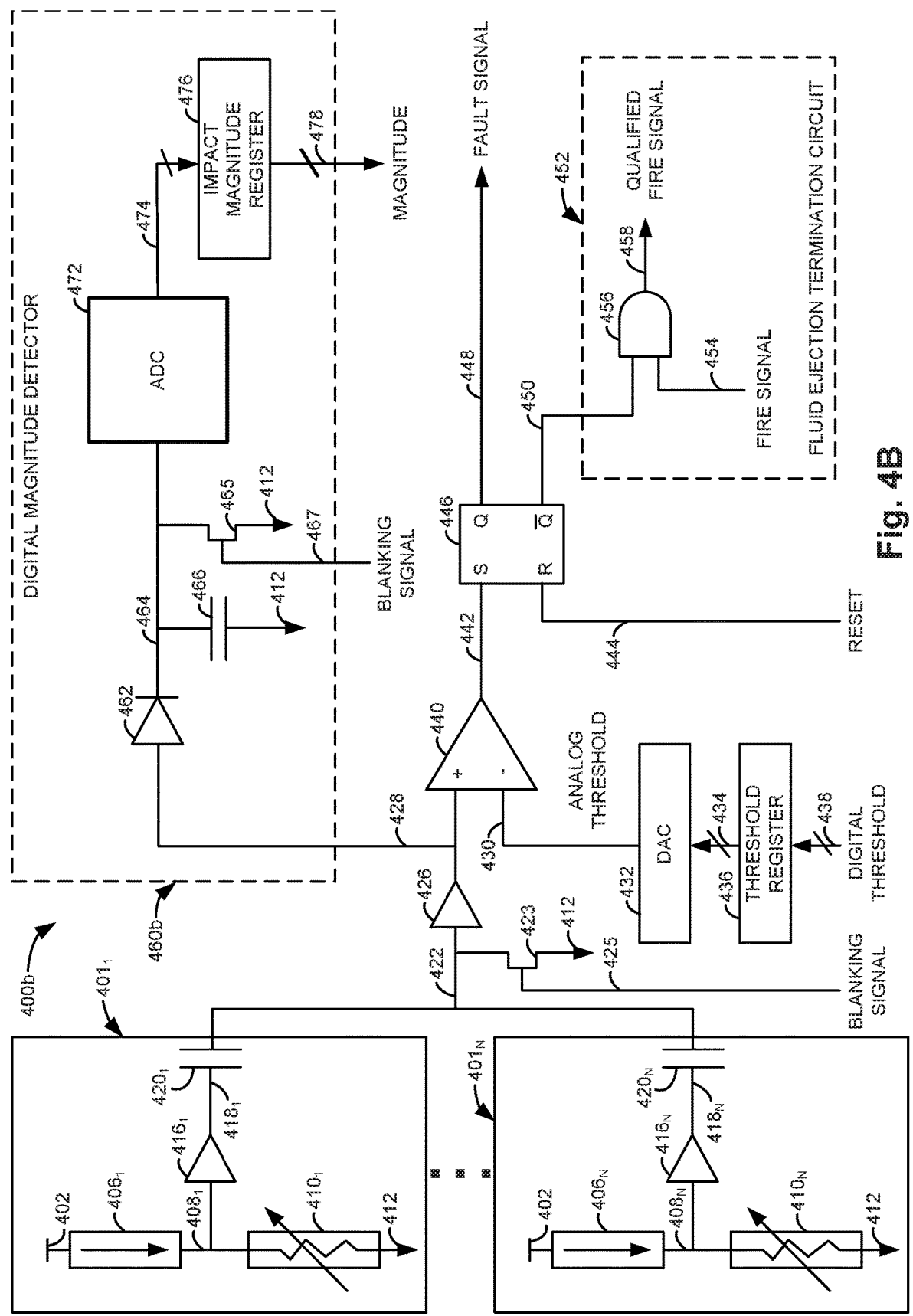
FIG. 4B is a circuit diagram illustrating another example of an impact detector.

FIG. 4B is a circuit diagram illustrating another example of an impact detector 400b. Impact detector 400b is similar to impact detector 400a previously described and illustrated with reference to FIG. 4A, except that impact detector 400b includes a plurality of strain gauge sensors circuits $401_1$ to $401_N$, where "N" is any suitable number of strain gauge sensor circuits, and the bleeder resistors are replaced with blanking switches 423 and 465. Blanking switches 423 and 465 may be field-effect transistors (FETs) or other suitable switches.

Each strain gauge sensor circuit $401_1$ to $401_N$ includes a biasing circuit $406_1$ to $406_N$ (e.g., a current source), a strain gauge sensor $410_1$ to $410_N$, a low pass filter $416_1$ to $416_N$, and a DC blocking capacitor $420_1$ to $420_N$, respectively. One terminal of each biasing circuit $406_1$ to $406_N$ is electrically coupled to supply voltage 402. The other terminal of each biasing circuit $406_1$ to $406_N$ is electrically coupled to one terminal of a corresponding strain gauge sensor $410_1$ to $410_N$ and the input of a corresponding low pass filter $416_1$ to $416_N$ via a corresponding analog signal path $408_1$ to $408_N$. The other terminal of each strain gauge sensor $410_1$ to $410_N$ is electrically coupled to bias voltage 412 (e.g., a common or ground). The output of each low pass filter $416_1$ to $416_N$ is electrically coupled to one terminal of a corresponding DC blocking capacitor $420_1$ to $420_N$ through a corresponding analog signal path $418_1$ to $418_N$.

Each biasing circuit $406_1$ to $406_N$ biases a corresponding strain gauge sensor $410_1$ to $410_N$ (e.g., via a constant current). In one example, each strain gauge sensor $410_1$ to $410_N$ is provided by a strain gauge sensor 200 previously described and illustrated with reference to FIG. 2A or a strain gauge sensor 210 previously described and illustrated with reference to FIG. 2B. Each strain gauge sensor $410_1$ to $410_N$ provides a voltage signal corresponding to the sensed strain. In one example, a low pass filter $416_1$ to $416_N$ low pass filters the corresponding sensed strain to remove errant noise signals that are shorter in duration than would be expected from an impact event. In other examples, low pass filters $416_1$ to $416_N$ are excluded from impact detector 400b. Each DC blocking capacitor $420_1$ to $420_N$ nulls out any process, voltage, and temperature (PVT) variation effects on the corresponding sensed strain signal, which may be small compared to the PVT effects.

The other terminal of each DC blocking capacitor $420_1$ to $420_N$ is electrically coupled to one side of the drain-source path of blanking switch 423 and the input of scaling buffer 426 through analog signal path 422. The other side of the drain-source path of blanking switch 423 is electrically coupled to bias voltage 412. The control or gate input of blanking switch 423 receives a blanking signal through a signal path 425. In this example, blanking switch 423 is used in place of a bleeder resistor to prevent parasitic charge from accumulating on node 422. Between strain events, the blanking signal is briefly applied to blanking switch 423 to close the switch and discharge any parasitic charge that has accumulated on node 422. In this example with plurality of strain gauge sensor circuits $401_1$ to $401_N$, comparator 440 outputs a fault signal in response to the sensed strain from any of the plurality of strain gauge sensors $410_1$ to $410_N$ exceeding the analog impact threshold value.

In digital magnitude detector 460b, blanking switch 465 is used in place of a bleeder resistor to discharge peaking capacitor 466 between strain events. The output of peaking diode 462, one terminal of peaking capacitor 466, and the input of ADC 472 are electrically coupled to one side of the drain-source path of blanking switch 465 through analog signal path 464. The other side of the drain-source path of blanking switch 465 is electrically coupled to bias voltage 412. The control or gate input of blanking switch 465 receives a blanking signal through a signal path 467. Between strain events, the blanking signal is briefly applied to blanking switch 465 to close blanking switch 465 and discharge peak capacitor 466. In one example, the blanking signal applied to blanking switch 465 and the blanking signal applied to blanking switch 423 between strain events are applied substantially simultaneously. In other examples, there is another suitable timing between the blanking signal applied to blanking switch 465 and the blanking signal applied to blanking switch 423 between strain events. In this example with plurality of strain gauge sensor circuits $401_1$ to $401_N$, digital magnitude detector 460b detects the peak magnitude of the sensed strain from any of the plurality of strain gauge sensors $410_1$ to $410_N$.

Figure 5:
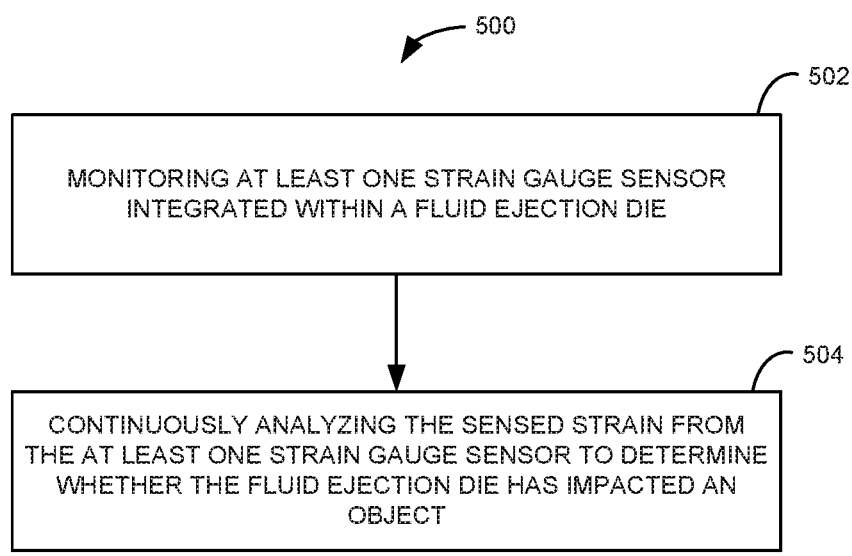
FIG. 5 is a flow diagram illustrating one example of a method for maintaining a fluid ejection system.

FIG. 5 is a flow diagram illustrating one example of a method 500 for maintaining a fluid ejection system. At 502, method 500 includes monitoring at least one strain gauge sensor integrated within a fluid ejection die. At 504, method 500 includes continuously analyzing the sensed strain from the at least one strain gauge sensor to determine whether the fluid ejection die has impacted an object. In one example, continuously analyzing the sensed strain includes comparing a peak sensed strain to an impact threshold and providing a fault signal in response to the peak sensed strain exceeding the impact threshold. Method 500 may also include detecting a peak magnitude of the sensed strain and converting the peak magnitude to a digital value. Further, method 500 may include stopping or modifying operation of the fluid ejection system in response to determining the fluid ejection die has impacted an object.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A fluid ejection die comprising:
a plurality of actuation devices to eject fluid drops;
at least one strain gauge sensor to sense strain; and
a comparator to provide a fault signal in response to the sensed strain exceeding an impact threshold.

2. The fluid ejection die of claim 1, further comprising:
a circuit between the at least one strain gauge sensor and the comparator, the circuit to scale and offset the sensed strain and provide the scaled and offset sensed strain to the comparator.

3. The fluid ejection die of claim 2, wherein the circuit comprises:
a direct current (DC) blocking capacitor between the at least one strain gauge sensor and the comparator;
a bleeder resistor or blanking switch to prevent parasitic charge from accumulating on a node between the DC blocking capacitor and the comparator; and
at least one of a low pass filter between the at least one strain gauge sensor and the DC blocking capacitor and a scaling buffer between the DC blocking capacitor and the comparator.

4. The fluid ejection die of claim 1, further comprising:
a biasing circuit to bias the at least one strain gauge sensor.

5. The fluid ejection die of claim 1, further comprising:
a circuit to provide an analog impact threshold value,
wherein the comparator compares the analog impact threshold value to the sensed strain.

6. The fluid ejection die of claim 1, further comprising:
a latch set in response to the fault signal to maintain the fault signal until the latch is reset.

7. The fluid ejection die of claim 6, further comprising:
a fluid ejection termination circuit to prevent the ejection of fluid drops from the actuation devices while the fault signal is maintained.

8. The fluid ejection die of claim 1, wherein the at least one strain gauge sensor comprises a piezoelectric sensor element.

9. The fluid ejection die of claim 1, wherein the at least one strain gauge sensor comprises four piezoelectric sensor elements configured in a Wheatstone bridge configuration.

10. A fluid ejection die comprising:
a plurality of actuation devices to eject fluid drops;
at least one strain gauge sensor to sense strain; and
a digital magnitude detector to detect the magnitude of the sensed strain.

11. The fluid ejection die of claim 10, further comprising:
a circuit between the at least one strain gauge sensor and the digital magnitude detector, the circuit to scale and offset the sensed strain and provide the scaled and offset sensed strain to the digital magnitude detector.

12. The fluid ejection die of claim 10, further comprising:
a direct current (DC) blocking capacitor between the at least one strain gauge sensor and the digital magnitude detector;
a bleeder resistor or blanking switch to prevent parasitic charge from accumulating on a node between the DC blocking capacitor and the digital magnitude detector;
at least one of a low pass filter between the at least one strain gauge sensor and the DC blocking capacitor and a scaling buffer between the DC blocking capacitor and the digital magnitude detector; and
a biasing circuit to bias the at least one strain gauge sensor.

13. The fluid ejection die of claim 10, wherein the digital magnitude detector comprises:
a peaking diode to receive the sensed strain from the at least one strain gauge sensor;
a peaking capacitor charged in response to the output of the peaking diode;
a bleeder resistor or blanking switch to discharge the peaking capacitor between strain events; and
an analog to digital converter to convert the peak analog signal from the peaking capacitor to a digital impact magnitude.

14. The fluid ejection die of claim 10, wherein the at least one strain gauge sensor comprises a piezoelectric sensor element.

15. The fluid ejection die of claim 10, wherein the at least one strain gauge sensor comprises four piezoelectric sensor elements configured in a Wheatstone bridge configuration.

16. A method for maintaining a fluid ejection system, the method comprising:
   monitoring at least one strain gauge sensor integrated within a fluid ejection die; and
   continuously analyzing the sensed strain from the at least one strain gauge sensor to determine whether the fluid ejection die has impacted an object,
   wherein continuously analyzing the sensed strain comprises comparing a peak sensed strain to an impact threshold and providing a fault signal in response to the peak sensed strain exceeding the impact threshold.

17. The method of claim 16, wherein the at least one strain gauge sensor comprises a piezoelectric sensor element.

18. The method of claim 16, wherein the at least one strain gauge sensor comprises four piezoelectric sensor elements configured in a Wheatstone bridge configuration.

19. A method for maintaining a fluid ejection system, the method comprising:
   monitoring at least one strain gauge sensor integrated within a fluid ejection die;
   continuously analyzing the sensed strain from the at least one strain gauge sensor to determine whether the fluid ejection die has impacted an object;
   detecting a peak magnitude of the sensed strain; and
   converting the peak magnitude to a digital value.

20. A method for maintaining a fluid ejection system, the method comprising:
   monitoring at least one strain gauge sensor integrated within a fluid ejection die;
   continuously analyzing the sensed strain from the at least one strain gauge sensor to determine whether the fluid ejection die has impacted an object; and
   stopping or modifying operation of the fluid ejection system in response to determining the fluid ejection die has impacted an object.

* * * * *